United States Patent [19]

Dummersdorf et al.

[11] Patent Number: 5,505,909
[45] Date of Patent: Apr. 9, 1996

[54] PROCESS AND A DEVICE FOR DETOXIFYING THE WASTE GASES FROM WASTE INCINERATING PLANTS

[75] Inventors: Hans-Ulrich Dummersdorf, Leverkusen; Heinz Dummersdorf, Grimma, both of Germany

[73] Assignee: Maschinen-und Anlagenbau Grimma GmbH, Grimma, Germany

[21] Appl. No.: 182,084

[22] PCT Filed: Jul. 12, 1991

[86] PCT No.: PCT/EP91/01312

§ 371 Date: May 16, 1994

§ 102(e) Date: May 16, 1994

[87] PCT Pub. No.: WO93/00982

PCT Pub. Date: Jan. 21, 1993

[51] Int. Cl.⁶ .............. B01D 50/00; F01N 3/08; A61D 3/00; F28D 15/00
[52] U.S. Cl. .............. 422/168; 422/169; 422/170; 422/175; 422/186.2; 588/210; 588/211; 588/212; 588/227; 165/104.34
[58] Field of Search .............. 422/169, 168, 422/170, 175, 186.04, 186.07, 186.12, 186.2, 186.21, 186.22; 204/157.3; 588/210–212, 227; 110/208, 210, 345, 235, 236; 165/158

[56] References Cited

U.S. PATENT DOCUMENTS

| | | | |
|---|---|---|---|
| 4,438,706 | 3/1984 | Boday et al. | 588/212 |
| 4,508,040 | 4/1985 | Santen et al. | 110/345 X |
| 4,509,434 | 4/1985 | Boday et al. | 110/238 |
| 4,602,574 | 7/1986 | Bach et al. | 588/211 X |
| 4,612,981 | 9/1986 | Palz et al. | 165/158 |
| 4,793,974 | 12/1988 | Hebrank | 422/175 |
| 5,095,826 | 3/1992 | Erisson et al. | 110/212 |

FOREIGN PATENT DOCUMENTS

| | | |
|---|---|---|
| 0295083 | 12/1988 | European Pat. Off. |
| 3206785 | 10/1982 | Germany |
| 2165827 | 4/1986 | United Kingdom |
| 2174691 | 11/1986 | United Kingdom |

OTHER PUBLICATIONS

R. Karger et al., "Enkstickung von Müllheizkraftwerken—Erfahrungen der Kraftwirtschaft", *Abfallwirtschaftsjournal*, (1990) pp. 184, 189–190 (translation provided for the marked portions).

*Primary Examiner*—Robert J. Warden
*Assistant Examiner*—Christopher Y. Kim
*Attorney, Agent, or Firm*—Panitch Schwarze Jacobs & Nadel

[57] ABSTRACT

The invention relates to a process and a device for detoxifying the waste gases from waste incinerating plants, at least one plasma gas flow being admixed to the hot fresh flue gas flow from the waste incinerating plant for the thermal decomposition of the toxic compounds, the fresh flue gas flow is preferably heated up in a recuperation stage with a high-temperature heat exchanger by the plasma-beam-treated flue gas in the counter-flow principle and subsequently at least one plasma gas flow is mixed into the fresh flue gas heated in this fashion. Following this, the gas mixture being at a peak temperature is used for heating up the fresh flue gas flow in the recuperation stage and cooled to a temperature which is still above the waste gas temperature, and it is subsequently finally treated in a waste heat system and a flue gas purification.

11 Claims, 2 Drawing Sheets

PROCESS AND A DEVICE FOR DETOXIFYING THE WASTE GASES FROM WASTE INCINERATING PLANTS

BACKGROUND OF THE INVENTION

1. Field of the Invention

The invention relates to a process and a device for detoxifying the waste gases from waste incinerating plants, in particular hazardous waste incinerating plants to eliminate toxic compounds such as organic halogen substances and hydrocarbons.

The invention is particularly provided for the complete elimination of dioxins, CFCs and other toxic substances from the waste gases of waste incinerating plants, in particular hazardous waste incinerating plants.

2. Description of the Prior Art

In addition to the waste dumps which can only be extended to a limited degree for space and acceptance reasons, waste incinerating plants represent practically the one and only problem solution for the elimination of existing waste products for the disposal of industrial and communal waste products, the operating of waste and hazardous waste incinerating plants or the construction of new plants also meeting with increasing resistance and decreasing acceptance. This is particularly attributable to the fact that, as was shown by more recent investigations, the waste gas purification of the waste incinerating plants is insufficient particularly in view of dioxins and other toxic chemical compounds.

The problem consists above all in that bonded chlorine is present in all industrial and communal waste products to a certain degree, which causes the formation of the highly toxic and especially feared higher chlorinated hydrocarbons, in particular dibenzodioxins and dibenzofurans, during combustion.

Considering this problem which has already been known for quite some time, the combustion temperature is bindingly fixed at values above 1200° C. for the greatest possible avoidance or reduction of the formation of such compounds in the flue gas of the waste incinerating plant, this temperature being customarily achieved in the waste incinerating plants mostly by a high-temperature combustion stage connected downstream of the conventionally used rotary tubular kiln.

Nevertheless, it became apparent that emissions of dangerous substances occur in almost all waste incinerating plants despite this, which have a number of causes. These causes consist e.g. in that the combustion chambers in the rotary tubular kilns or in the high-temperature post-combustion allow temperature fields which are inhomogeneous in terms of space and time to occur in their interior due to heat surges at different points. In addition to this, the heterogeneity of the supplied waste products, e.g. as regards calorific values, composition, etc., requires a complex control of the undergrate firing performance or the batch combination in order to observe the required minimum temperatures.

Moreover, it was detected more recently that dioxins can also be formed at lower temperatures, e.g. in the range of 300° to 400° C. as they prevail in and downstream of the waste heat boiler of the incinerating plant, at a later point in time and independently of the high-temperature incinerating stage in the case of the presence of hydrocarbon residues from the combustion, chlorine-containing compounds and oxygen and in the presence of catalytically acting dusts.

Above all, not decomposed organic chloride substances from the combustion and the high-temperature combustion stage, and newly formed organic chloride substances from residual hydrocarbons not decomposed by the high-temperature combustion in the area of the waste heat boiler at temperatures between 300° and 400° C., are thus emission sources for hazardous products.

Since these disadvantages are in general inherent to hazardous waste incinerating plants (destruction efficiency for chlorinated hydrocarbons being 99.998% as a maximum) their ecopolitical acceptance is already basically questioned without alternative concepts for a waste product elimination without the use of incinerating plants having been actually made available so far.

Due to the waste eliminating capacity of such plants which, on the other hand, is high, efforts must above all be focussed on a waste gas atmosphere from waste incinerating plants, which is actually completely free from residues of highly toxic compounds.

It has already been attempted to bypass the new formation of polychlorinated hydrocarbons by the fact that the temperature range of from 400° to 300° C. is rapidly traversed by means of the injection of water. However, this solution has the disadvantage that the formation of dioxins and furans cannot be safely and reliably prevented. Moreover, the pre-formed dioxins and furans and other chlorinated hydrocarbons or chlorofluorocarbons emitted from the high-temperature combustion change cannot be eliminated.

According to more recent findings (Abfallwirtschaftsjournal 2/1990 No. 4), a secondary, catalytically initiated dioxin formation takes place particularly place in the waste heat system when the range of 350° to 300° C. is traversed, in addition to the primary dioxin formation in the high-temperature stage of a waste incinerating plant. It has been suggested to inhibit dioxin formation here by injecting specific chemicals. In addition to the difficult operation sequence, in particular in view of the temperature profile, the primary dioxin formation is, however, not prevented by this, since this share is already present in the flue waste gas.

Thus, a decisive disadvantage of most known waste incinerating plants and combustion processes which could not be eliminated so far consists in that, in view of the temperature level and the homogeneity they temperature field in the combustion zones of the do not have the prerequisites for a complete thermal destruction of the polychlorinated hydrocarbons.

It has also already been suggested to dispose of waste products by means of a chemically reactive steam plasma without forming pollutants. However, this process is not suited for the detoxification of large gas flows such as fresh flue gas flows from waste incinerating plants, which have low pollutant concentrations, since its use is impossible for energy reasons (heating up of very large gas flows) and is also ineffective in terms of process technology, because the chemically reactive influence of the steam plasma on the pollutants could not be achieved in a gas flow consisting almost completely of flue gas. Further reasons, e.g. that a plasmatron/plasma reactor combination could not be operated with such large flue gas flows, oppose to the use of this process in the present case of application.

Moreover, it is also already known to carry out a final flue gas purification behind the special waste combustion by means of the dioxins, furans and polycyclic hydrocarbons to activated coke (Abfallwirtschaftsjournal 2/1990, No. 4, page 173). However, this process certainly requires additional expensive process steps and expensive materials and leads to the production of a highly concentrated activated coke, whose disposal is again difficult and which may form a new, great environmental pollution.

SUMMARY OF THE INVENTION

Consequently, the invention is based on the object of indicating a process and a device for treating and detoxifying the waste gases from the waste incinerating plants of the type mentioned at the beginning in such fashion that no compounds detrimental to the environment are emitted any longer by these plants. It is to be in particular possible to retrofit already existing waste incinerating plants in simple fashion with the device according to the invention or to operate them with the process according to the invention without this resulting in considerable cost increases. Moreover, the expenditure for investment and operating costs of the waste incinerating plant are not substantially increased beyond the former measure, and changes in the operational sequence are avoided during operation of the waste incinerating plant.

The invention is in particular based on the object of indicating a process and a device of the type mentioned at the beginning, by means of which it is possible to destroy the hydrocarbons and organic halogen substances, which are present in the flue gas of waste incinerating plants in very small concentrations and to suppress their new formation under all operating conditions without having to change the process-technology operation sequence of the waste incinerating plant. Moreover, the solution is to make it advantageously possible to take energy-management aspects into consideration and to create the prerequisites for the fact that a waste heat utilization can be carried out with a high degree of efficiency.

According to the invention, the aforementioned object is attained by a process for detoxifying the waste gases from waste incinerating plants, in which at least one plasma gas flow is mixed into the waste gases forming a hot fresh flue gas flow from the waste incinerating plant for the thermal decomposition of the toxic compounds.

In this fashion, a destruction of toxic substances in the flue gas cannot only be reliably achieved, but also with a relatively low energy expenditure. At first, the hot fresh flue gas flow is preferably further heated with a high-temperature heat exchanger and subsequently the fresh flue gas flow heated in this fashion is still further heated by injecting at least one plasma gas flow. A solution advantageous in terms of energy is achieved according to a further preferred example of embodiment by using the waste heat of the waste gases from the plasma stage, i.e. the gas mixture consisting of fresh flue gas and plasma gas is used as a heating medium in a counterflow principle following the plasma beam treatment, in order to further heat the fresh flue gas flow coming from the waste incinerating plant to prepare it for the plasma beam gas treatment.

Consequently, an especially preferred embodiment of the process according to the invention consists in further heating up the hot fresh flue gas flow from the waste incinerating plant in a high-temperature heat exchanger, to subsequently heat it further by mixing it at least with one plasma beam from one or several plasmatrons and by subsequently using the gas mixture (fresh flue gas/plasma beam gas) having the highest temperature value directly for heating up the fresh flue gas, preferably in the counter-flow principle, which is supplied to the plasma beam treatment downstream of the plasmatron.

The fresh gas flow is preferably directly taken from the high-temperature combustion stage or the post-combustion stage of the waste incinerating plant.

The use of the fresh flue gas as a heating medium for the fresh flue gas coming from the waste incinerating plant is not imperative for the main object of the present invention, the complete elimination of dioxins and furans from the waste gas of waste incinerating plants, i.e. the heating up of the fresh flue gas flow downstream of the plasmatron(s) can also be carried out in another fashion. However, it is especially advantageous for energy reasons to operate the high-temperature heat-exchanger with the gas mixture from fresh flue gas and plasma beam gas which is present downstream of the plasmatron(s) as a heat carrier and in a counter-flow process.

Air can be used as a plasma carrier gas, possibly steam may also be suitable.

A solution particularly preferred for energy reasons is the use of a partial flow of the hot waste gas or fresh flue gas as a plasma carrier gas which is removed from the fresh flue gas flow prior to the feeding into the high-temperature heat exchanger.

To attain the aforementioned object, a device is provided according to the invention downstream of the waste incinerating plant in which the fresh flue gas flow is subjected to a treatment with a plasma gas for the thermal decomposition of residual dioxin and furan compounds still present in the fresh flue gas flow of the waste incinerating plant.

The waste incinerating plant is preferably connected to a recuperator which comprises integrally a high-temperature heat exchanger and at least one plasmatron in contructional unit with the same, the high-temperature heat exchanger being operable in a counter-flow process with the gas mixture downstream of the plasmatron, which consists of the heated fresh flue gas flow and the plasma beam gas flow injected in to heat as a heating medium.

According to a further preferred embodiment of the invention the device comprises a waste heat utilization stage and a flue gas purification stage downstream of the recuperator.

Further preferred developments of the subject matter of the invention are indicated in the remaining sub-claims.

DESCRIPTION OF THE PREFERRED EMBODIMENTS

Figure 1:
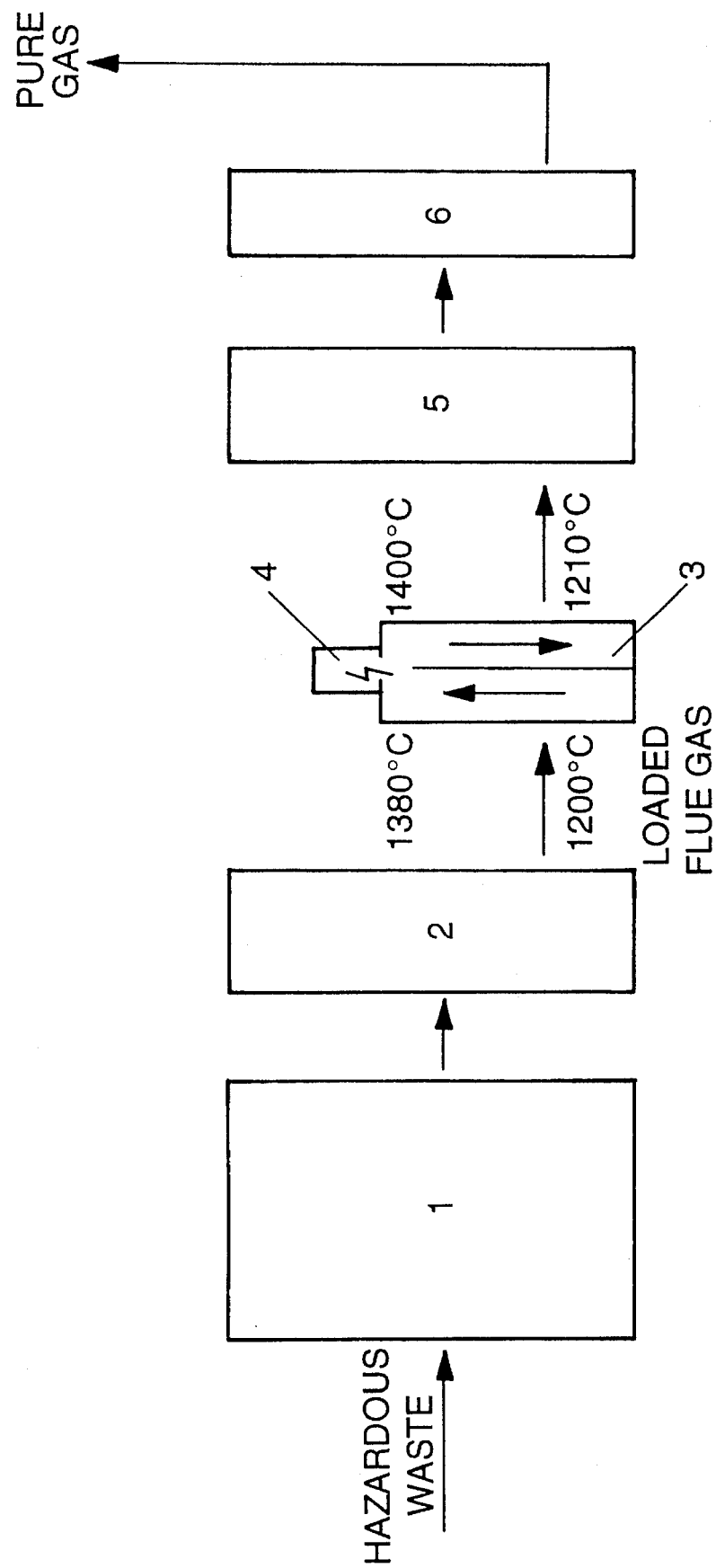
FIG. 1 shows a schematic representation of a hazardous waste incinerating plant with an integrated plasma high-temperature stage according to an example of an embodiment of the invention.

An example of embodiment of the process according to the invention, which is also particularly preferred under energy-management viewpoints, for eliminating e.g. dioxins from the waste gases of high-temperature waste incineration in connection with a high-temperature exchanger, to which a plasma stage can be connected for the plasma beam treatment of the waste gas with low energy requirements, works as follows:

At first, the waste gas (fresh flue gas flow) taken from a high-temperature combustion stage of the waste incinerating plant, which is connected upstream, said waste gas being loaded with highly toxic pollutants in a very low concentration, is heated to a higher temperature of e.g. 1200° C. to 1380° C. in a high-temperature heat exchanger downstream of a high-temperature combustion stage of the waste incinerating plant, which is connected upstream.

Due to this, a thermal decomposition of pollutants in the gas phase takes place, particularly at the hot walls of the high-temperature heat exchanger which have a higher temperature than the gas phase itself. Thus, a large portion of the unreacted, organic components originating from the high-temperature combustion stage of the waste incinerating plant is already destroyed in the gas phase in this first step of the thermal treatment of the waste gases taken from the waste incinerating plant. The second process step of the thermal action on the flue gas flow is formed by the admixing of a chemically non-active low-capacity plasma beam to the comparatively voluminous flue gas flow, which causes a slight increase in temperature in the form of a peak heating in it , e.g. to about 1400° C. and more. Due to the occurring increase in temperature, a further part of the organic pollutant components is decomposed, and partly also contaminated fly-ash is thus heated up to the core of the ash particles so that organic products are destroyed down to the core.

Moreover, due to the high temperature at the surface of the ash particles, a thin melt layer is formed which solidifies in glass-like fashion and results in the fly-dust being rendered inert as regards elution. At the same time, the prerequisite for the heat exchange process in the high-temperature heat exchanger, which is particularly preferred for the practical implementation of the invention, is created. Following the thermal plasma beam treatment of the flue gas flow, the gas mixture formed in this fashion is preferably again introduced into the high-temperature heat exchanger , and this gas mixture having a peak temperature is cooled with the entering fresh flue gas flow in the counter-flow. The complete destruction of organic pollutants takes place, since this temperature level (cooling phase following the plasma beam treatment) is also still above the maximum temperature level which can be achieved in the waste incinerating plant.

With the three coupled process steps explained above, which from a unit with respect to the thermal operational sequence for the elimination of residual dioxins and furans and are especially preferred and useful under energy aspects, not only the already existing dioxins and furans are destroyed, but their new formation is also reliably prevented in the low-temperature range in the waste heat system by the fact that all organic substances present in flue gas are destroyed, so that no starting products are available for the new formation of dioxin and furans in the critical range of subsequent flue gas cooling between 400° and 300° C.

The effectiveness of the process according to the invention and the device according to the invention do not depend on the pollutant concentration and thus the operational requirements in the actual combustion stage so that a reliable detoxification of the flue gases is also given for the retrofitting of waste incinerating plants working at customary firing temperatures without high-temperature combustion stage.

The invention is explained in greater detail in the following by means of an example of embodiment and FIG. 1.

Such a hazardous waste incinerating plant with an annual capacity of 10,000 t produces a flue gas flow of 20,000 Nm$^3$/h. The customary hazardous waste incinerating plant, to which hazardous waste is supplied consists of a firing chamber 1 and a post-combustion chamber 2. The fresh flue gas flow (waste gas) is present at a temperature of about 1200° C. when it leaves the high-temperature post-combustion stage. This corresponds to a thermal enthalpy flow of about 9 MW. In addition to nitrogen and oxygen (air), the flue gas contains $CO_2$, steam, HCl and $Cl_2$ and also 150 mg/m$^3$ of dibenzodioxins and 100 mg/m$^3$ further chlorinated aliphatic and aromatic hydrocarbons from the reaction of chlorinated hydrocarbons, the latter having been formed in the post-combustion chamber 2 due to an insufficient reaction due to thermal inhomogeneities, and are a considerable threat to the environment in the existing concentration. The flue gas from the waste incinerating plant 1, 2 also contains soot and fly-ash particles.

This flue gas which has a temperature of 1200° C. is supplied to a recuperation stage 3 which contains a high-temperature heat exchanger. The fresh flue gas flow is introduced into the casing chamber of the high-temperature heat exchanger of the recuperation stage 3. It comprises downstream of the feeding of the flue gas flow at least one integrated plasmatron 4, by means of which all chemical compounds are decomposed into their elements, which subsequently form chemically stable, non-hazardous compounds, in particular $H_2O$ and $CO_2$ in the case of a targeted quenching. The fresh flue gas flow is heated up by the-plasmatron 4 in the casing chamber of the high-temperature heat exchanger of the recuperator 3 on its way to the plasma beam treatment, namely in the counterflow by means of the waste gases of the plasma stage formed by the plasmatron 4, i.e. by the gas mixture from fresh flue gas flow and plasma beam gas flow, which has a peak temperature of e.g. 1400° C. following the injection of the plasma gas. Due to this counter-flow heating in the high-temperature heat exchanger of the recuperation stage 3, the temperature of the fresh flue gas flow is increased from about 1200° C. to about 1380° C. Here, the thermal decomposition of 90% of the chlorinated hydrocarbons or of the dibenzodioxins still present in the flue gas occurs in particular at the hot pipe wall of the high-temperature heat exchanger in the recuperator 3 under thermal conditions, which cannot be implemented in a conventional high-temperature post-combustion. An air plasma beam from a plasmatron 4 with an output of about 150 kW is introduced into this flue gas flow heated to about 1380° C., after it has left the high-temperature heat exchanger of the recuperation stage 3, said air plasma beam having a temperature of 4000° C. This output corresponds to about 1.7% of the entire thermal flue gas enthalpy flow.

The air plasma beam is formed by the plasma carrier air throughput through the plasmatron 4 of about 100 Nm$^3$/h, which is extremely low as compared with the flue gas flow. At the downstream side, a uniform mixing of flue gas flow and air plasma beam takes place in this plasma stage, which causes a further temperature-field-free peak heating of the fresh flue gas flow by only 20° C. to about 1400° C. This increase in temperature causes a further thermal decomposition of dioxins, chlorinated hydrocarbons, etc. by about 9.5%. Moreover, since this area is additionally free from a temperature field, a non-decomposing of stable chlorinated hydrocarbons, dioxins, etc. is prevented by this maximum-temperature zone.

The gas mixture from the fresh flue gas flow and the air plasma beam with the chemically non-hazardous compounds such as $H_2O$ and $CO_2$, which were reacted by the plasma treatment and which leave the plasmatron 4 as gases with a temperature of 1400° C., is supplied immediately afterwards to the pipe chamber of the high-temperature heat exchanger of the recuperation stage 3 and cooled to about 1210° C. in counter-flow with the fresh flue gas flow. This operational sequence makes a heating up of the flue gas flow originating from the hazardous waste incinerating plant 1, 2 to 1380° C. possible with very low energy requirements. The final cooling temperature in this cooling stage is always above the maximum temperature produced with the conventional high-temperature combustion so that this stage also contributes towards the completion of thermal pollutant decomposition. The flue gas flow treated in this fashion is subsequently supplied to a conventional waste heat system 5 with a linked up flue gas purification stage 6. Pure gas is discharged from this flue gas purification stage 6, which is free from dioxins and other organic compounds.

The process and the device according to the aforementioned example of embodiment of the invention ensure under all operational conditions of the combustion stage that the waste gases are free from chlorinated hydrocarbons and dioxins and that the total plant meets the highest requirements of environmental protection.

The entire process can also be implemented at a higher temperature level as regards the peak heating in the plasma stage of the plasmatron 4. The use of the recuperation stage leads to extremely low energy requirements; moreover, the retrofitting of existing waste incinerating plants is also possible in an uncomplicated fashion.

Figure 2:
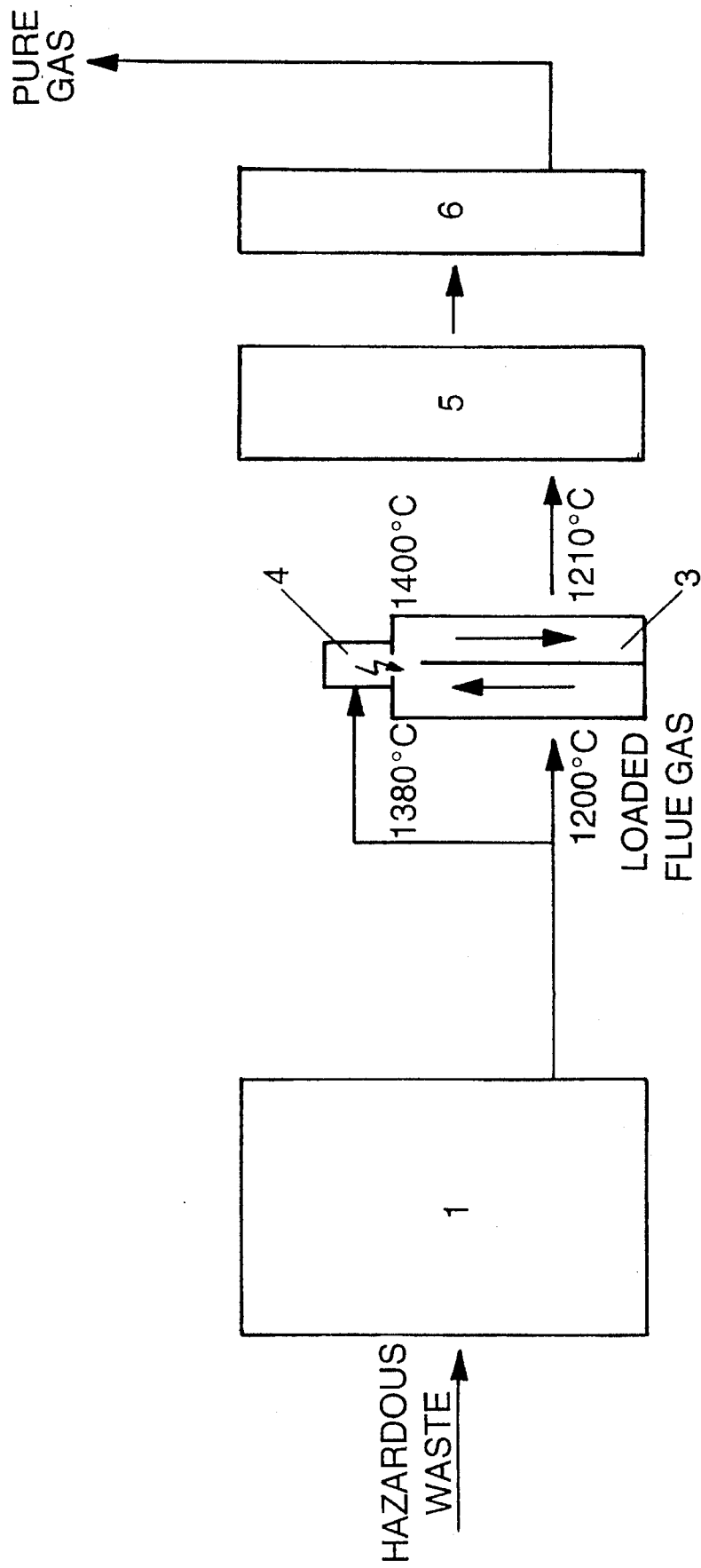
FIG. 2 shows a schematic representation of a hazardous waste incinerating plant with an integrated plasma high-temperature stage according to an example of an alternative embodiment of the invention.

According to a further embodiment of the invention, the customary high-temperature post-combustion stage 2 in the waste incinerating plant, which is represented in FIG. 1, can also be renounced as shown in FIG. 2.

The maximum-temperature stage—working according to the process of the invention—within the framework of the recuperation stage 3 and the plasma treatment by the plasmatron 4 is then directly linked up to the primary firing of the firing chamber 1 (rotary tubular kiln) of the waste incinerating plant. In this case, the high-temperature heat exchanger in the recuperation stage 3 must then be designed for a high temperature difference.

It is reliably prevented by the invention that dioxins, furans and other toxic substances are emitted by a waste incinerating plant into the atmosphere.

A main advantage of the invention is that a destruction of toxic substances in the flue gas can be achieved with relatively low energy requirements. Despite a plasma injection into the flue gases, the entire process is implemented in such fashion that they are not converted to the plasma condition. A heating of the entire flue gas flow in the plasmatron would be connected with an unjustifiable energy expenditure. The plasma beam treatment only requires a small difference in temperature in the fresh flue gas due to the process of the invention and the associated device.

The process being particularly preferred according to an embodiment of the invention distinguishes itself by the fact that the still hot fresh flue gas from the waste incinerating plant is further heated up in a high-temperature heat exchanger, is subsequently further heated by mixing it with a plasma beam and is subsequently used in the high-temperature heat exchanger for heating the fresh flue gas withdrawn from the waste incinerating plant. A large portion of the organic compounds contained in the fresh flue gas are already destroyed during the heating up in the high-temperature heat exchanger. The admixing of a chemically inactive, small-output plasma beam, e.g. with air, steam or part of the fresh flue gas itself as a plasma gas, causes a slight further heating, which acts, on the one hand, to decompose the organic pollutants and, on the other, also destroys the organic components of the fly-ash and coats them with a layer of melt. In this fashion, the destruction of all organic substances in the fresh flue gas of the waste incinerating plant results in that dioxins and furans are not newly formed even in the critical temperature ranges of flue gas cooling (e.g. in the range between 400° and 300° C.). The energy expenditure for the elimination of highly toxic residual compounds in the waste gas of the waste incinerating plant is relatively small, because the necessary temperature is achieved without having to heat the entire flue gas flow to plasma temperature.

The invention distinguishes itself by the following further advantages:

reliable detoxification of the flue gases of waste incinerating plants irrespective of the type of the waste, the toxicity of the flue gases and the type of the combustion process, avoiding of the new formation of dioxins in the low-temperature area of the waste heat system by destroying all organic starting products necessary for this, high safety of the waste incinerating plant also in the case of transitional operating conditions such as load variations, scheduled or non-scheduled starting and stopping, malfunctions, etc.

low investment costs, possibility of retrofitting existing waste incinerating plants with little expenditure, rendering the fly-dust inert as regards elution by the formation of melt on the surface of the ash particles, avoiding of an essential influencing of the operation sequence of the waste incinerating plant, creation of sufficient time differences for the destruction of the dioxins and furans by the residence time of the flue gas in the high-temperature heat exchanger in the three stages of the same: casing chamber, pipe chamber and plasma stage, easy controllability of the temperature level of the high-temperature stage (recuperator stage 3 with plasma stage 4 and high-temperature heat exchanger) according to the invention to a respectively optimal value without substantially changing energy consumption, possible elimination of the customary high temperature post-combustion in the waste incinerating plant, including the required undergrate firing performance required for this.

We claim:

1. A process for detoxifying waste gas from a waste incinerating plant be eliminating toxic compounds comprising organic halogen compounds and hydrocarbons by thermal decomposition, the process comprising the steps of heating fresh flue gas leaving a waste incinerating plant with a high-temperature heat exchanger in a recuperation stage to provide heated flue gas and injecting at least one plasma gas into the heated flue gas to form a further heated mixture of the heated flue gas and the plasma gas, whereby the toxic compounds are thermally decomposed and using the mixture of the heated flue gas and the plasma gas as a heating medium for the high-temperature heat exchanger to heat the fresh flue gas, wherein the fresh flue gas from the waste incinerating plant is guided in a separate stream countercurrent to the mixture of plasma gas and heated flue gas towards a plasmatron integrally connected to the recuperation stage for injecting the plasma gas into said separate stream such that the mixture transfers heat to the fresh flue gas.

2. The process according to claim 1, further comprising mixing the plasma gas at a temperature of about 4000° C. into the heated flue gas at a temperature of about 1380° C. by a plasmatron integrally connected with the recuperation stage, and guiding the mixture of heated flue gas and plasma gas at about 1400° C. in counter-flow to the fresh flue gas from the waste incinerating plant to transfer heat to the fresh flue gas at a temperature of about 1200° C. and to cool the mixture to a temperature of about 1210° C.

3. The process according to claim 2, further comprising supplying the mixture leaving the high-temperature heat exchanger to a waste heat utilization stage and a flue gas purification stage.

4. The process according to claim 1, wherein the fresh flue gas is withdrawn directly from a high-temperature combustion stage of a waste incinerating plant.

5. The process according to claim 1, wherein the fresh flue gas is withdrawn directly from a primary combustion stage of a waste incinerating plant without a high-temperature combustion stage.

6. The process according to claim 1, wherein air is used as a plasma carrier gas.

7. The process according to claim 1, wherein steam is used as a plasma carrier gas.

8. The process according to claim 1, wherein a portion of the fresh flue gas is diverted for use as a plasma carrier gas prior to being fed to the high-temperature heat exchanger.

9. A device for detoxifying waste gas from a waste incinerating plant by eliminating toxic compounds comprising organic halogen substances and hydrocarbons by thermal decomposition, the device comprising at least one recuperator downstream from a waste incinerating plant, the recuperator comprising a high-temperature heat exchanger for heating flue gas from the incinerating plant and a plasmatron for mixing at least one plasma gas with heated flue gas, wherein the high-temperature heat exchanger and the plasmatron are integrally included in one constructional unit with means downstream from the plasmatron for guiding fresh flue gas from the waste incinerating plant in a separate stream countercurrent to a mixture of plasma gas and heated flue gas such that heat is transferred from the mixture to the fresh flue gas, and means upstream of the plasmatron for admitting heated flue gas to the recuperator.

10. The device according to claim 9, further comprising a waste heat utilization stage and a flue gas purification stage connected with the plasmatron in succession downstream of the recuperator.

11. The device according to claim 9, wherein the waste incinerating plant comprises a high-temperature combustion stage.

\* \* \* \* \*